Oct. 11, 1938.  E. A. O'BRIEN  2,132,966
CONFECTION
Filed March 19, 1937
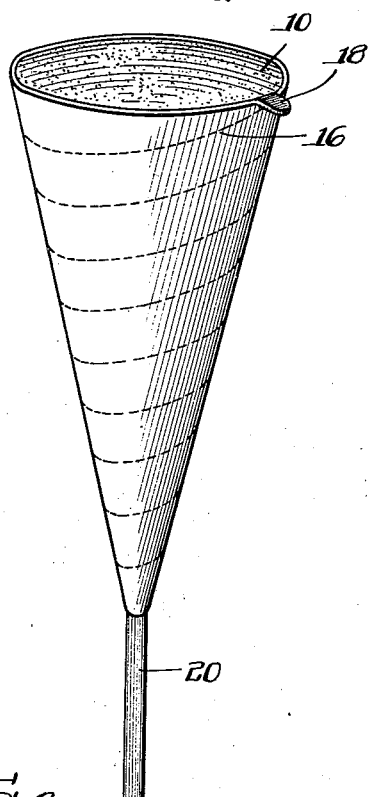
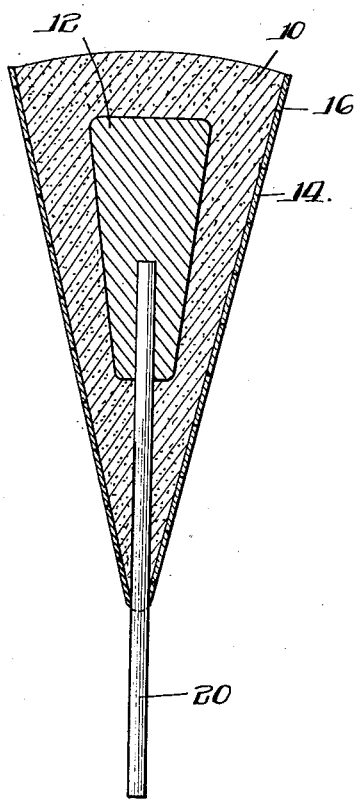
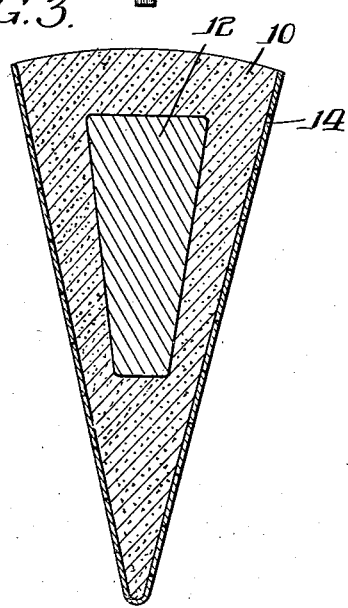
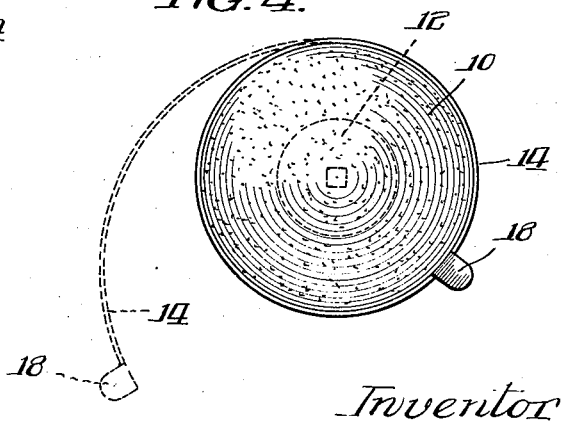
Inventor
Edson A. O'Brien
By:- Cox & Moore
attys.

Patented Oct. 11, 1938

2,132,966

UNITED STATES PATENT OFFICE 2,132,966

CONFECTION

Edson A. O'Brien, Burlington, Wash.

Application March 19, 1937, Serial No. 131,765

2 Claims. (Cl. 99—180)

This invention relates to a frozen confection.

It is an object of this invention to provide a combination frozen confection which is extremely palatable and appetizing and which may be readily handled and eaten without undue trouble.

A further object of this invention is to provide a composite type of frozen confection having a new and improved holding means associated therewith and which is normally substantially completely covered and enclosed by impervious means while being readily accessible for individual consumption.

Additional objects of the present invention are to provide an edible frozen confection in combination with a candy confection in suitable form for ready consumption and having holding and supporting means cooperating with said form to provide perfect support; to provide an outer covering and protecting wall having means for readily and progressively being removed and serving as a support for said confection; and to provide an outer coating and supporting means of new and improved form which, in combination with a separate supporting means, provide a permanently dry and clean exterior during the consumption of each unit while at the same time providing a holding means adequate to assure against accidental displacement.

Numerous other objects and advantages will be apparent from a consideration of the following specification and drawing which discloses a few preferred embodiments made in accordance with the principles of the present invention in which Figure 1 is a perspective elevation showing a preferred form of confection;

Figure 2 is a sectional elevation taken transversely across the diameter of the confection;

Figure 3 is a sectional elevation showing an alternative form of confection; and Figure 4 is a top view of the preferred embodiment showing a portion of the cover torn away.

The edible confection, shown in Figures 1 and 2 for purposes of illustration, comprises a conically shaped unit 10 of suitable frozen material having a similarly shaped core portion 12 of some contrasting confection situated centrally thereof. The outer conical unit preferably comprises any suitable frozen confection, such as ice cream, sherbets and ices of various kinds and/or flavors. The core portion 12, on the other hand, preferably consists of a non-frozen confection, such as fudge, chocolate, marshmallow, nougat or various combinations thereof.

The exterior of the conical unit 10 is provided with a uniform, snugly fitting covering 14 over the conical portions thereof which may be formed preferably of a sheet of waxed paper. However, it will be apparent that any suitable equivalent material may be employed, such as, for instance, pasteboard or any other layered, felted or textile material. It is preferred, however, to employ some sheet substance including a size or other ingredient, conferring upon it a generally impervious character.

The covering 14 is provided along its surface with a continuous line of perforations or spaced slits 16 which extend from a point at the top edge thereof downwardly, as shown in Figures 1 and 2, in a spiral of decreasing diameter. This line of perforations is of a type permitting ready tearing or severing therealong. A tab or suitable outstanding finger piece 18 extends from the upper edge of the covering at a point closely adjacent the juncture with the above described line of perforations 16.

In use, the consumer, therefore, initially grasps the finger piece 18, tearing away a small section along the line 16, thus exposing the adjacent portions of the confection for ready consumption. Employing this structure, it is, therefore, unnecessary to contact or dig into the edible portion in order to release the covering.

According to a preferred embodiment, a stick or handle 20 passes upwardly through the apex of the conical organization and extends for a desired distance into the interior confection. Although a rectangular stick 20 is shown in the figures, any preferred cross-sectional shape will be suitable. The handle, however, need not be of any considerable length but is preferably only in the nature of a stub handle, not intended by itself to provide the entire means of support but cooperating with the confection and its covering to provide a sturdy and convenient construction.

Thus the confection will be normally dispensed in the form shown in Figures 1 and 2, the user first tearing a short section along the line 16, as described above, and further parting or tearing away progressive sections of the spiral ribbon portion of the covering as the article is eaten.

Several important advantages result from the present invention. In the first place, the tendency of conventional frozen confections to break away and fall completely from the supporting handle is almost entirely obviated. It will be apparent that sidewise displacement of the handle 20 is generally impossible in view of the covering on the wall section 14 surrounding it in all transverse directions. Displacement in a longitudinal direction, however, is so non-existent as generally to create no problem in the art and is rendered considerably less likely due to the wedging action caused by the surrounding cone of material 10. So, too, insofar as the general structural unity is concerned, the walls of the covering 14, since they extend generally longitudinally of the handle 20, provide an ultimate combination having a high degree of strength and resistance to deformation of any type.

The handle 20, being extended into the core portion 12, adheres thereto so that the entire axial portion of the unit is relatively rigid. For many purposes this requirement is unnecessary since the mere embedding of the handle in the frozen confection, while surrounded by the covering, will be found sufficient. However, employing the arrangement shown in Figure 2, it will be noted that the frozen portion of the confection is supported over practically its entire length axially by a relatively rigid core portion and is at the same time supported exteriorly by the covering 14.

In this way a confection is provided which may be consumed without the conventional hazard resulting from the spilling or leaking of the contents or the disintegration of the entire structure which usually culminates in smearing or soiling the person or clothing of the user.

The alternative embodiment shown in Figure 3 omits completely the handle portion but comprises the frozen conical portion 10 having the core 12 and the covering 14 arranged in the same general relationship as defined above.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. An edible confection comprising a longitudinally extending stick handle having molded on one end thereof a portion comprising a confection non-fluid under odinary conditions, a conically shaped supporting member of non-edible sheet material arranged about said end of the stick handle, said handle extending substantially through the apex of the conical supporting member and being engaged thereby at an intermediate point in the length of the stick, said handle being substantially co-axial with said conical supporting member, said confection and the portion of said stick handle within the conical supporting member being spaced from the inner surface of said member to provide an axially extending central support within the conical supporting member, and a frozen confection situated interiorly of said conical supporting member in the space between the said member and the axially extending central support and being supported in direct contact with the said conical supporting member and the said central support.

2. An edible confection comprising a longitudinally extending stick handle having molded on one end thereof a portion comprising a confection non-fluid under ordinary conditions, a conically shaped supporting member of non-edible sheet material arranged about said end of the stick handle, said handle extending substantially through the apex of the conical supporting member and being engaged thereby at an intermediate point in the length of the stick, said handle being substantially co-axial with said conical supporting member, said confection and the portion of said stick handle within the conical supporting member being spaced from the inner surface of said member to provide an axially extending central support within the conical supporting member, and a frozen confection situated interiorly of said conical supporting member in the space between the said member and the axially extending central support and being supported in direct contact with the said conical supporting member and the said central support, said conical supporting member having weakening configurations thereon for permitting progressive removal of the sheet material in predetermined sections.

EDSON A. O'BRIEN.